United States Patent
Isono et al.

(10) Patent No.: US 10,358,051 B2
(45) Date of Patent: Jul. 23, 2019

(54) MOTOR DRIVE UNIT

(71) Applicants: TOYOTA JIDOSHA KABUSHIKI KAISHA, Toyota-shi, Aichi-ken (JP); ALCHEMICA CORPORATION, Susono-shi, Shizuoka (JP)

(72) Inventors: Hiroshi Isono, Susono (JP); Nobuyoshi Sugitani, Susono (JP); Aizoh Kubo, Kyoto (JP)

(73) Assignees: TOYOTA JIDOSHA KABUSHIKI KAISHA, Toyota (JP); ALCHEMICA CORPORATION, Susono (JP)

( * ) Notice: Subject to any disclaimer, the term of this patent is extended or adjusted under 35 U.S.C. 154(b) by 293 days.

(21) Appl. No.: 15/412,946

(22) Filed: Jan. 23, 2017

(65) Prior Publication Data
US 2017/0210244 A1 Jul. 27, 2017

(30) Foreign Application Priority Data

Jan. 22, 2016 (JP) .................................. 2016-010417

(51) Int. Cl.
*H02K 7/116* (2006.01)
*B60L 15/20* (2006.01)
(Continued)

(52) U.S. Cl.
CPC ............ *B60L 15/2009* (2013.01); *B60L 7/26* (2013.01); *B60L 15/2054* (2013.01); *F16D 65/186* (2013.01); *H02K 7/1021* (2013.01); *H02K 7/1025* (2013.01); *H02K 7/116* (2013.01); *B60L 2220/50* (2013.01); *B60L 2240/423* (2013.01); *F16D 2121/20* (2013.01); *F16D 2121/24* (2013.01); *F16D 2125/40* (2013.01); *Y02T 10/641* (2013.01); *Y02T 10/645* (2013.01); *Y02T 10/72* (2013.01); *Y02T 10/7275* (2013.01)

(58) Field of Classification Search
CPC .......................... H02K 7/116; F16D 2121/24
See application file for complete search history.

(56) References Cited

U.S. PATENT DOCUMENTS 3,812,928 A * 5/1974 Rockwell ............. B60K 7/0007
105/55
6,459,182 B1 * 10/2002 Pfann ................... H02K 7/1025
188/161
(Continued)

FOREIGN PATENT DOCUMENTS

JP 2004-032840 A 1/2004
JP 2004-142925 A 5/2004
(Continued)

*Primary Examiner* — Dang D Le
(74) *Attorney, Agent, or Firm* — Oliff PLC

(57) ABSTRACT

A motor drive unit having an inboard brake in which a lateral weight distribution is balanced is provided. In the motor drive unit, output torque of a drive motor is distributed to a right driveshaft and a left driveshaft via a drive gear a drive gear fitted onto an output shaft thereof. A brake rotor is also fitted onto the output shaft to be rotated integrally therewith. A brake device stops rotation of the drive gear by engaging the brake rotor with a brake stator that is allowed to rotate relatively to the brake rotor but restricted to rotate in a rotational direction of the brake rotor. The brake device is disposed on an opposite side of the drive motor across the drive gear.

5 Claims, 2 Drawing Sheets

(51) Int. Cl.
*H02K 7/102* (2006.01)
*B60L 7/26* (2006.01)
*F16D 65/18* (2006.01)
*F16D 121/20* (2012.01)
*F16D 121/24* (2012.01)
*F16D 125/40* (2012.01)

(56) References Cited

U.S. PATENT DOCUMENTS

2016/0131212 A1   5/2016  Yamasaki et al.
2016/0153537 A1*  6/2016  Kubo ..................... F16H 48/10
                                                     475/150
2016/0312873 A1  10/2016  Nakayama et al.

FOREIGN PATENT DOCUMENTS

| JP | 2007-198558 A | 8/2007 |
|---|---|---|
| JP | 2015-001238 A | 1/2015 |
| JP | 2015-232368 A | 12/2015 |
| WO | 2015/008661 A1 | 1/2015 |
| WO | 2015/093454 A1 | 6/2015 |

* cited by examiner

MOTOR DRIVE UNIT

CROSS REFERENCE TO RELATED APPLICATION

The present invention claims the benefit of Japanese Patent Application No. 2016-010417 filed on Jan. 22, 2016 with the Japanese Patent Office, the disclosures of which are incorporated herein by reference in its entirety.

BACKGROUND

Field of the Invention

Embodiments of the present application relates to the art of a drive motor used as a prime mover of automobiles, and especially to a motor drive unit having a power transmission device between the drive motor and drive wheels.

Discussion of the Related Art

PCT international publication WO 2015/008661 describes one example of a motor drive unit of this kind. The drive gear unit taught by WO 2015/008661 as a torque vectoring device comprises a differential unit for distributing torque delivered from a drive motor to right and left drive wheels, and a differential motor for controlling a torque split ratio to the drive wheels. The differential unit comprises a pair of single-pinion planetary gear units, and sun gears of the planetary gear units are connected to both ends of a rotary shaft. An input gear is fitted onto an intermediate portion of the rotary shaft, and torque of the drive motor is applied to the input gear. Ring gears of the planetary gear units are connected to each other through a torque reversing device so that the ring gears are rotated in opposite directions. The differential motor is connected to one of the ring gears, and drive wheels are connected the carriers of the planetary gear units.

A driving performance of an electric vehicle may be improved by using the torque vectoring device taught by WO 2015/008661 as a motor drive unit. The motor drive unit of this kind may serve as an inboard brake by incorporating a brake device into the motor drive unit to apply brake torque to the drive wheels. To this end, for example, an electromagnetic brake may be used in the motor drive unit. In this case, a hydraulic system and reinforcements such as a brake caliper and so on may be omitted, and hence the motor drive unit may be downsized and lightened. In addition, an unsprung load of the vehicle may be reduced.

However, in the torque vectoring device taught by WO 2015/008661, an output torque of the drive motor is applied to the input gear disposed on the width center of the vehicle. To this end, the drive motor has to be disposed on one side of the vehicle. In the motor drive unit, a weight of the drive motor is relatively larger than those of other members and this may cause a disruption of a weight balance of the vehicle. In the conventional motor drive unit, therefore, it is preferable to arrange the brake motor in such a manner as to maintain weight balance of the vehicle.

SUMMARY

Aspects of embodiments of the present application have been conceived noting the foregoing technical problems, and it is therefore an object of embodiments of the present application is to provide a motor drive unit having an inboard brake that can be arranged in a vehicle while maintaining a balanced lateral weight distribution.

The present application relates to a motor drive unit, comprising: a drive motor serving as a prime mover of a vehicle; a first differential unit having a first input element, a first output element and a first reaction element; a second differential unit having a second input element, a second output element and a second reaction element; a connection shaft connecting the first input element and the second input element; an input gear fitted onto the connection shaft between the first input element and the second input element; a drive gear fitted onto the output shaft of the drive motor while being meshed with the input gear to transmit torque between the connection shaft and the output shaft; a torque reversing mechanism that transmits torque of any one of the first reaction element and the second reaction element to the other reaction element while reversing a direction of the torque; and a first driveshaft connected to the first output element and a second driveshaft connected to the second output element to which output torque of the drive motor is distributed. In order to achieve the above-explained objective, according to the embodiment of the present application, the motor drive unit is provided with a brake device that stops rotation of the drive gear fitted onto the output shaft by engaging at least one rotary member rotated integrally with the output shaft with at least one brake member that is allowed to rotate relatively to the rotary member but restricted to rotate in a rotational direction of the rotary member. In the motor drive unit, according to the embodiment, the brake device is disposed on an opposite side of the drive motor across the drive gear fitted onto the output shaft.

In a non-limiting embodiment, the motor drive unit may further comprise: a brake motor that generates torque when energized; and an engagement force generating device that generates a thrust force to bring the brake member into frictional engagement with the rotary member when the torque of the brake motor is applied thereto, and that keeps the frictional engagement between the brake member and the rotary member to stop rotation of the output shaft when current supply to the brake motor is interrupted. The brake motor and the engagement force generating device may also be disposed on the opposite side of the drive motor across the drive gear fitted onto the output shaft.

In a non-limiting embodiment, the brake device may include an electromagnetic brake that establishes a magnetic attraction when energized to engage the brake member with the rotary member.

Thus, according to the embodiment of the present application, the drive motor serving as a prime mover of the vehicle and the differential unit for distributing torque of the drive motor may be arranged in the motor drive unit. Since the motor drive unit according to the embodiment comprises the brake device, the motor drive unit may also serve as an inboard brake of the vehicle. According to the embodiment of the present application, therefore, an unsprung load of the vehicle may be reduced. As described, according to the embodiment, the brake device is disposed on the opposite side of the drive motor across the drive gear fitted onto the output shaft while being meshed with the input gear fitted onto an intermediate portion of the connection shaft. That is, the brake device and the drive motor are disposed on both width ends of the motor drive unit. According to the embodiment of the present application, therefore, weight distribution in the motor drive unit can be balanced in the lateral direction of the vehicle. In addition, shape of the motor drive unit may be substantially symmetric widthwise. For this reason, lengths of the first driveshaft and the second driveshaft may be equalized so that design flexibility can be enhanced.

In addition, according to the embodiment of the present application, the vehicle may be stopped by the brake motor and the engagement force generating device even when the power is off to park the vehicle. As also described, the brake motor and the engagement force generating device are also disposed on the opposite side of the drive motor across the drive gear fitted onto the output shaft. For this reason, the weight distribution in the motor drive unit can be balanced in the lateral direction of the vehicle.

Further, since the electromagnetic brake is used as the brake device, a hydraulic system and reinforcements such as a brake caliper and so on may be omitted, and hence the motor drive unit may be downsized and lightened.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 1:
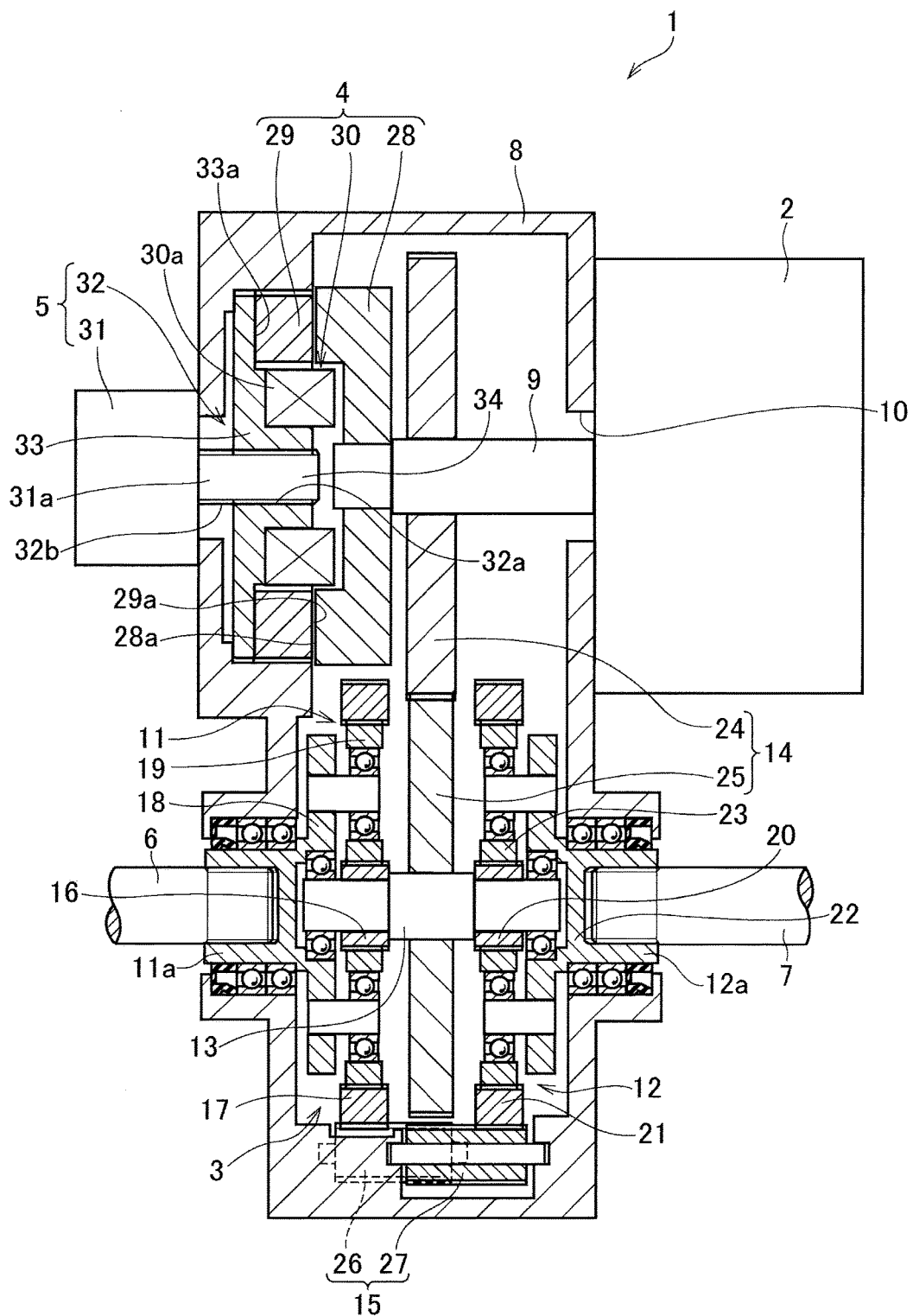
FIG. 1 is a cross-sectional view showing one embodiment of the motor drive unit according to the embodiment.

Preferred embodiments of the present application will now be explained with reference to the accompanying drawings. Referring now to FIG. 1, there is shown a preferred embodiment of the motor drive unit according to the present application. The motor drive unit shown in FIG. 1 comprises a drive motor 2, a differential unit 3, a brake device 4, a parking brake device 5, a first driveshaft 6 and a second driveshaft 7.

The drive motor 2 is intended to be used as a prime mover of a vehicle, and for example, a permanent magnet synchronous motor, and an induction motor may be used as the drive motor 2. The drive motor 2 is fixed to a casing 8, and an output shaft 9 of the drive motor 2 that is rotated integrally with a rotor (not shown) is inserted into the casing 8 through an insertion hole 10 so that an output torque of the drive motor 2 is delivered to the differential unit 3 through the output shaft 9.

According to the example shown in FIG. 1, the differential unit 3 comprises a first planetary gear unit 11, a second planetary gear unit 12, a connection shaft 13 connecting the first planetary gear unit 11 and the second planetary gear unit 12, a transmission mechanism 14 transmitting torque between the drive motor 2 and the connection shaft 13, and a torque reversing mechanism 15 transmitting torque between the first planetary gear unit 11 and the second planetary gear unit 12 while reversing direction of the torque. Here, structures of the first planetary gear unit 11 and the second planetary gear unit 12 are identical to each other.

The first planetary gear unit 11 is a single-pinion planetary gear unit comprises a first sun gear 16, a first ring gear 17 as an internal gear arranged concentrically with the first sun gear 16, a plurality of pinion gears 19 interposed between the first sun gear 16 and the first ring gear 17 while meshing with those gears, and a first carrier 18 supporting the pinion gears 19 in a rotatable manner. As described later, an output torque of the drive motor 2 is applied to the first sun gear 16 through the transmission mechanism 14 and the connection shaft 13. The first ring gear 17 is connected to a second ring gear 21 of the second planetary gear unit 12, and the first carrier 18 is connected to the first driveshaft 6. On an outer circumference of the first ring gear 17, outer teeth are also formed to be meshed with a first pinion 26 of the torque reversing mechanism 15.

Accordingly, the first planetary gear unit 11 serves as a first differential unit, the first sun gear 16 serves as a first input element, the first ring gear 17 serves as a first reaction element, and the first carrier 18 serves as a first output element.

The second planetary gear unit 12 is also a single-pinion planetary gear unit comprises a second sun gear 20, a second ring gear 21 as an internal gear arranged concentrically with the second sun gear 20, a plurality of pinion gears 23 interposed between the second sun gear 20 and the second ring gear 21 while meshing with those gears, and a second carrier 22 supporting the pinion gears 23 in a rotatable manner. As described later, an output torque of the drive motor 2 is also applied to the second sun gear 20 through the transmission mechanism 14 and the connection shaft 13. The second ring gear 20 is connected to the first ring gear 17 of the first planetary gear unit 11, and the second carrier 22 is connected to the second driveshaft 7. On an outer circumference of the second ring gear 21, outer teeth are also formed to be meshed with a second pinion 27 of the torque reversing mechanism 15.

Accordingly, the second planetary gear unit 12 serves as a second differential unit, the second sun gear 20 serves as a second input element, the second ring gear 21 serves as a second reaction element, and the second carrier 22 serves as a second output element.

As described, structures of the first planetary gear unit 11 and the second planetary gear unit 12 are identical to each other. That is, teeth numbers and configurations of the gears, and gear ratios of the first planetary gear unit 11 and the second planetary gear unit 12 are identical to each other. Here, a double-pinion planetary gear unit may also be used as the first planetary gear unit 11 and the second planetary gear unit 12.

The connection shaft 13 extends parallel to the output shaft 9 of the drive motor 2 to connect the first sun gear 16 of the first planetary gear unit 11 to the second sun gear 20 of the second planetary gear unit 12. In the example shown in FIG. 1, specifically, the first sun gear 16 is fitted onto a left end of the connection shaft 13 to be rotated integrally therewith, and the second sun gear 20 is fitted onto a right end of the connection shaft 13 to be rotated integrally therewith. A driven gear 25 of the transmission mechanism 14 is fitted onto an intermediate portion of the connection shaft 13. The first planetary gear unit 11 is supported by the casing 8 at a first boss 11a in a rotatable manner, and the second planetary gear unit 12 is supported by the casing 8 at a second boss 12a in a rotatable manner.

The transmission mechanism 14 comprises a drive gear 24 and a driven gear 25 as an input gear to form a power transmission route between the output shaft 9 of the drive motor 2 and the differential unit 3. Specifically, the drive gear 24 is fitted onto the output shaft 9 of the drive motor 2 to be rotated integrally therewith, and the driven gear 25 is fitted onto the intermediate portion of the connection shaft 13 to be rotated integrally therewith and to be meshed with the drive gear 24. Thus, the output torque of the drive motor 2 is delivered to the connection shaft 13 through the transmission mechanism 14.

The torque reversing mechanism 15 comprises the first pinion 26 and the second pinion 27 to transmit torque between the first ring gear 17 and the second ring gear 21 while reversing a direction. Specifically, both of the first pinion 26 and the second pinion 27 are cylindrical gears, and face widths of the first pinion 26 and the second pinion 27 are longer than those of the first ring gear 17 and the second ring gear 21. Here, teeth number of the first pinion 26 is identical to that of the second pinion 27. The first pinion 26 extends parallel to the output shaft 9 and the connection shaft 13, and supported by the casing 8 in a rotatable manner. According to the example shown in FIG. 1, a left part of the first pinion 26 is meshed with the outer teeth of the first ring gear 17, and a right part of the first pinion 26 is meshed with a left part of the second pinion 27. Likewise, a right part of the second pinion 27 is meshed with the outer teeth of the second ring gear 21, and the left part of the second pinion 27 is meshed with the right part of the first pinion 26. In the differential unit 3, a plurality of the torque reversing mechanism 15 are arranged around the first ring gear 17 and the second ring gear 21 at regular intervals.

For example, when the vehicle travels in a straight line, the output torque of the drive motor 2 is applied to the first sun gear 16 and the second sun gear 20, and then distributed equally to the first carrier 18 and the second carrier 22. In this situation, the torque of the first sun gear 16 is applied to the first ring gear 17 while being reversed, and the torque of the second sun gear 20 is applied to the second ring gear 21 while being reversed. That is, the torque delivered from the drive motor 2 is applied to the first ring gear 17 and the second ring gear 21 in the same direction. However, since the first ring gear 17 and the second ring gear 21 are connected through the torque reversing mechanism 15, the torque of the first ring gear 17 and the torque of the second ring gear 21 counteract to each other. In the differential unit 3, therefore, the torque delivered from the drive motor 2 is distributed equally to the first carrier 18 and the second carrier 22. That is, if the first carrier 18 and the second carrier 22 are rotated at the same speeds, the first ring gear 17 and the second ring gear 21 will not be rotated in any direction. In this situation, therefore, the first ring gear 17 and the second ring gear 21 may serve as a reaction element of each of the first planetary gear unit 11 and the second planetary gear unit 12.

In the motor drive unit according to the preferred embodiment, the connection between the first planetary gear unit 11 and the second planetary gear unit 12 may be altered according to need. For example, the first sun gear 16 and the second sun gear 20 may also be connected through the connection shaft 13. In this case, the first sun gear 16 serves as the first input element, and the second sun gear 20 serves as the second input element. Further, the first ring gear 17 and the second ring gear 21 may also be connected through the torque reversing mechanism 15. In this case, the first ring gear 17 serves as the first reaction element, and the second ring gear 21 serves as the second reaction element.

The differential unit 3 further comprises a brake device 4 as an electromagnetic brake. The brake device 4 comprises a brake rotor 28, a brake stator 29, and a brake solenoid 30. When the brake solenoid 30 is energized, the brake stator 29 is brought into contact to the brake rotor 28 to generate braking torque for stopping the rotation of a predetermined rotary member. That is, the brake device 4 will not generate braking torque unless the brake solenoid 30 is energized.

Specifically, the brake rotor 28 is a disc-shaped magnetic member, and the brake rotor 28 is also fitted onto a leading end of the motor shaft 9 to be rotated integrally with the motor shaft 9. A first friction face 28a is formed on an outer circumferential portion of one face of the brake rotor 28 to be opposed to a below-mentioned second friction face 29a of the brake stator 29. Accordingly, the brake rotor 28 serves as the claimed rotary member.

The brake stator 29 is also an annular magnetic member, and the brake stator 29 is splined to an inner circumferential face of the casing 8. Specifically, a spline ridge (or groove) is formed on an outer circumferential face of the brake stator 29 in the axial direction to be splined to a spline groove (or ridge) formed on an inner circumferential face of a spline hole of the casing 8 in the axial direction. Thus, in the casing 8, the brake stator 29 is allowed to reciprocate in the axial direction but restricted to rotate around the output shaft 9. The above-mentioned second friction face 29a is formed on the outer circumferential portion of the face of the brake stator 29 opposed to the first friction face 28a of the brake rotor 28. Accordingly, the brake stator 29 serves as the claimed brake member.

The brake solenoid 30 comprises the brake rotor 28 serving as a fixed magnetic pole, a coil 30a wound around an iron core (not shown), and the brake stator 29 serving as a movable magnetic pole. The coil 30a is attached to a pushing member 33 of the parking brake device 5 made of non-magnetic material. In the embodiment shown in FIG. 1, a predetermined clearance is maintained between an inner circumferential face of the brake stator 29 and an outer circumferential face of the coil 30a within the influence of magnetic field of the coil 30a so that the brake stator 29 is allowed to reciprocate on the coil 30a.

When a predetermined current is applied to the coil 30a, the coil 30a establishes magnetic attraction so that the brake stator 29 is magnetically attracted toward the brake rotor 28. Consequently, the second friction face 29a of the brake stator 29 is brought into frictional contact to the first friction face 28a of the brake rotor 28 so as to stop the rotation of the output shaft 9. Optionally, although not especially illustrated in FIG. 1, a return spring may be used to isolate the second friction face 29a away from the first friction face 28a when stopping current supply to the coil 30a to allow the motor shaft 9 to rotate.

Thus, the motor drive unit 1 is provided with the brake device 4 to stop the rotation of the output shaft 9 of the drive motor 2. In the motor drive unit 1, rotations of the first sun gear 16 and the second sun gear 20 of the differential unit 3 can be stopped through the transmission mechanism 14 and the connection shaft 13 by thus stopping the rotation of the output shaft 9 by the brake device 4. Consequently, rotations of the first carrier 18 and the second carrier 22 are stopped so that rotations of the first driveshaft 6 and the second driveshaft 7 are stopped. That is, the motor drive unit 1 may also serve as an inboard brake.

In order to maintain a balanced lateral weight distribution in the motor drive unit 1, the drive motor 2 and the brake device 4 are disposed on both ends of the output shaft 9 across the drive gear 24 meshing with the driven gear 25 disposed on the intermediate portion of the connection shaft 13.

In the motor drive unit 1, the drive motor 2 is relatively heavier than the other components. Likewise, the brake device 4 is also heavier than the other components. In the motor drive unit 1 according to the preferred embodiment, however, the drive motor 2 and the brake device 4 are disposed on each width ends in the motor drive 1. According to the preferred embodiment, therefore, the weight distribution in the motor drive unit 1 can be balanced in the lateral direction.

In the vehicle, the right wheel is connected to the motor drive unit 1 through the second driveshaft 7, and the left wheel is connected to the motor drive unit 1 through the first driveshaft 6. As described, since the drive motor 2 and the brake device 4 are disposed on each width ends in the motor drive unit 1, shape of the motor drive unit 1 may be substantially symmetric widthwise. According to the preferred embodiment, therefore, lengths of the first driveshaft 6 and the second driveshaft 7 may be equalized so that design flexibility can be enhanced.

As described, the motor drive unit 1 is provided with the parking brake device 5, and the parking brake device 5 comprises an engagement force generating device and a brake motor 31 that generates a torque when energized to actuate the engagement force generating device. In the motor drive unit 1, therefore, the brake stator 29 may be brought into frictional engagement with the brake rotor 28 to stop the rotation of the output haft 9 even when the brake device 4 is unenergized.

The brake motor 31 is also fixed to the casing 8, and an motor shaft 31a of the brake motor 31 that is rotated integrally with a rotor (not shown) is inserted into the casing 8 through an insertion hole. According to the embodiment shown in FIG. 1, a male thread 32b of a below-mentioned feed screw mechanism 32 is formed on an outer circumferential surface of the motor shaft 31a.

According to the preferred embodiment, the feed screw mechanism 32 that translates rotational motion to linear motion is employed as the engagement force generating device, and the feed screw mechanism 32 is actuated by the brake motor 31. Instead, a rack and pinion, a translation actuator, a hydraulic actuator etc. may also be used as the engagement force generating device, and those devices may also be actuated by the brake motor 31.

Specifically, the feed screw mechanism 32 generates a thrust force to push the brake stator 29 toward the brake rotor 28 thereby bringing the brake stator 29 into frictional contact to the brake rotor 28. In addition, the feed screw mechanism 32 keeps the output shaft 9 stopping even if current supply to the brake device 4 is interrupted. To this end, the feed screw mechanism 32 is provided with a pushing member 33 and a rotary shaft 34.

The pushing member 33 is a disc-shaped non-magnetic member, and a female thread hole 32a is formed on a center of the pushing member 33 in such a manner as to penetrate through the pushing member 33 in a thickness direction. The aforementioned coil 30a of the brake solenoid 30 is fitted onto a center protrusion of the pushing member 33 while being restricted to slide thereon. A pushing face 33a on which the brake stator 29 is disposed is formed on the pushing member 33 around the coil 30a. As the brake stator 29, a spline ridge (or groove) is formed on an outer circumference of the pushing member 33. The pushing member 33 is fitted into the spline hole of the casing 8, and then the brake stator 29 is also fitted into the spline hole of the casing 8.

The rotary shaft 34 is connected to the motor shaft 31a of the brake motor 31 to be rotated integrally therewith, and the male thread 32b is also formed on an outer circumferential face of the rotary shaft 34. The male thread 32b of the rotary shaft 34 is screwed into the female thread hole 32a of the pushing member 33 to form the feed screw mechanism 32. For example, a ball screw actuator, a trapezoidal screw actuator, a square screw actuator etc. may serve as the female thread hole 32a and the male thread 32b.

Specifically, the feed screw mechanism 32 generates a thrust force (or an axial force) for pushing the pushing member 33 in the axial direction toward the brake rotor 28 by rotating the rotary shaft 34 connected to the motor shaft 31a by the brake motor 31 in a predetermined direction (i.e., in the forward direction). By contrast, the pushing member 33 is withdrawn from the brake rotor 28 by rotating the rotary shaft 34 in the opposite direction (i.e., in the reverse direction).

Thus, in the parking brake device 5, the feed screw mechanism 32 generates forward thrust force by generating forward torque by the brake motor 31, and the forward thrust force is applied to the brake stator 29. Consequently, the brake stator 29 is frictionally engaged with the brake rotor 28 to halt the output shaft 9. By contrast, the motor shaft 9 is allowed to rotate by generating a reverse torque by the brake motor 31 to withdraw the brake stator 29 from the brake rotor 28. That is, the braking force for stopping the rotation of the output shaft 9 is cancelled.

In addition, reversed efficiency of the feed screw mechanism 32 to translate linear motion to rotational motion is adjusted to be lower than forward efficiency to translate rotational motion to linear motion. That is, mechanical efficiency of the feed screw mechanism 32 is tuned in such a manner that the pushing member 33 is moved more efficiently toward the brake rotor 28 by rotating the rotary shaft 34 in the forward direction, and that the rotary shaft 34 is rotated in the reverse direction less efficiently by withdrawing the pushing member 33 from the brake rotor 28. According to the preferred example, therefore, the output shaft 9 may be halted by pushing the brake stator 29 toward the brake rotor 28 by the feed screw mechanism 32 even if the current supply to the brake device 4 and the brake motor 31 is stopped.

In the motor drive unit 1, the parking brake device 5 is also disposed on the opposite side of the drive motor 2 across the drive gear 24. That is, the feed screw mechanism 32 and the brake motor 31 are disposed on the opposite side of the drive motor 2 across the drive gear 24.

As described, the drive motor 2 is relatively heavier than the other components, and may be heaviest in the motor drive unit 1. In addition, a larger drive motor is required for generating larger drive force. In the motor drive 1 according to the preferred embodiment, however, both of the brake device 4 and the parking brake device 5 are disposed on the opposite side of the drive motor 2 across the drive gear 24. According to the preferred embodiment, therefore, the weight distribution in the motor drive unit 1 can be balanced in the lateral direction. In addition, shape of the motor drive unit 1 may be substantially symmetric widthwise.

Figure 2:
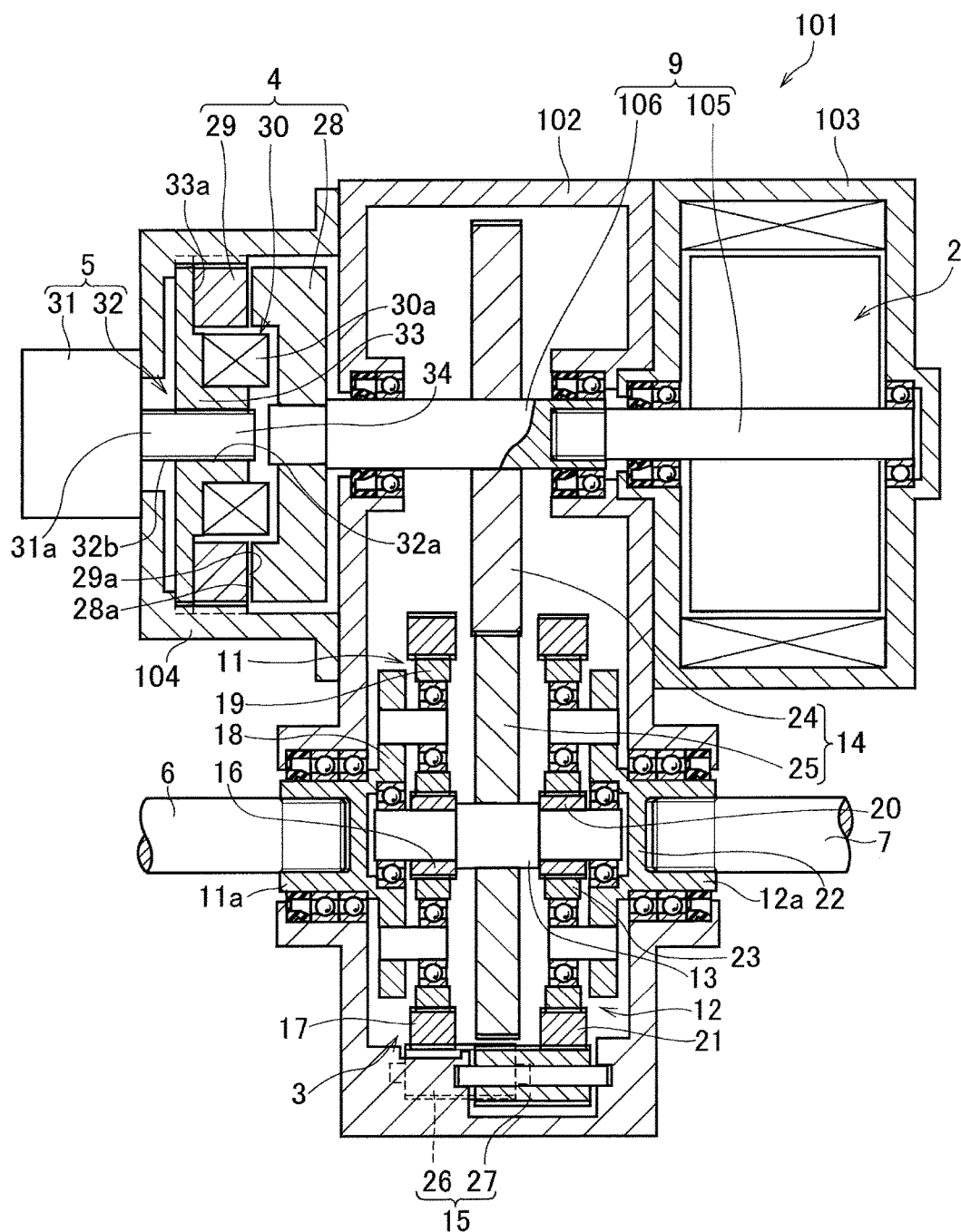
FIG. 2 is a cross-sectional view showing another embodiment of the motor drive unit according to the embodiment.

Turning now to FIG. 2, there is shown another embodiment of the motor drive unit according to the present application. The motor drive unit 101 also comprises the drive motor 2, the differential unit 3, the brake device 4, the parking brake device 5, the first driveshaft 6 and the second driveshaft 7. Structures of those elements are identical to those of the motor drive unit 1 shown in FIG. 1, and detailed explanations for the common elements will be omitted by allotting common reference numerals thereto.

In the foregoing embodiment shown in FIG. 1, the main components of the motor drive unit 1 such as the differential unit 3 and the brake device 4 are held in the integrated casing 8. By contrast, according to another embodiment shown in FIG. 2, the differential unit 3 is held in a gear case 102, the drive motor 2 is held in a motor case 103, and the brake device 4 is held in a brake case 104.

According to another embodiment, specifically, the motor case 103 is attached to one of lateral faces of the gear case 102, and the brake case 104 is attached to other lateral face of the gear case 102. Since the gear case 102 and the motor case 103 are thus formed separately, the output shaft 9 of the drive motor 9 is divided into a first output shaft 105 and a second output shaft 106.

The first output shaft 105 is rotated integrally with a rotor (not shown) of the drive motor 2. A leading end of the first output shaft 105 protrudes from the motor case 103, and a spline ridge is formed on the leading end of the first output shaft 105 to be splined to a spline groove formed on one end of the second output shaft 106.

Both ends of the second output shaft 106 are supported by the gear case 102 through bearings. A leading end (i.e., other end) of the second output shaft 106 protrudes from the gear case 102 to be joined to the brake rotor 28 so that the brake rotor 28 is rotated integrally with the output shaft 9.

According to another embodiment shown in FIG. 2, the brake motor 31 is fixed to the brake case 104 and the motor shaft 31a of the brake motor 31 is inserted into the brake case 104. The feed screw mechanism 32 is formed on a leading end of the motor shaft 31a, and the pushing member 33 is fitted onto the leading end of the motor shaft 31a. Outer circumferential edges of the pushing member 33 and the brake stator 29 are also splined to the inner surface of the spline hole of the brake case 104, and the brake solenoid 30 is fitted onto the pushing member 33.

According to another embodiment of the motor drive unit, the motor case 103 is attached to the gear case 102, and the first output shaft 105 is connected to the second output shaft 106 to form the output shaft 9. Likewise, the brake case 104 is also attached to the gear case 102. In the brake case 104, the brake rotor 28 fitted onto the leading end of the second output shaft 106, and the brake stator 29 and the brake solenoid 30 being opposed to the brake rotor 28 serve as the brake device 4.

Thus, in the motor drive unit 101, the brake device 4 and the parking brake device 5 are also disposed on the opposite side of the drive motor 2 across the drive gear 24. According to another embodiment, therefore, the weight distribution in the motor drive unit 101 may also be balanced in the lateral direction. In addition, shape of the motor drive unit 101 may also be substantially symmetric widthwise.

Although the above exemplary embodiment of the present application has been described, it will be understood by those skilled in the art that the present application should not be limited to the described exemplary embodiment, and various changes and modifications can be made within the spirit and scope of the present application.

What is claimed is:

1. A motor drive unit, comprising:
a drive motor serving as a prime mover of a vehicle;
a first differential unit having a first input element, a first output element and a first reaction element;
a second differential unit having a second input element, a second output element and a second reaction element;
a connection shaft connecting the first input element and the second input element;
an input gear fitted onto the connection shaft between the first input element and the second input element;
a drive gear fitted onto an output shaft of the drive motor while being meshed with the input gear to transmit torque between the connection shaft and the output shaft;
a torque reversing mechanism that transmits torque of any one of the first reaction element and the second reaction element to the other reaction element while reversing a direction of the torque;
a first driveshaft connected to the first output element and a second driveshaft connected to the second output element to which output torque of the drive motor is distributed; and
a brake device that stops rotation of the drive gear fitted onto the output shaft when a predetermined current is supplied to the brake device, the brake device stopping the rotation by engaging at least one rotary member rotated integrally with the output shaft with at least one brake member that is allowed to rotate relatively to the rotary member but restricted to rotate in a rotational direction of the rotary member,
wherein the brake device is disposed on an opposite side of the drive motor across the drive gear fitted onto the output shaft.

2. The motor drive unit as claimed in claim 1, wherein the brake device includes an electromagnetic brake that establishes a magnetic attraction when energized to engage the brake member with the rotary member.

3. The motor drive unit as claimed in claim 1, wherein the brake device comprising a parking brake continues to stop the rotation of the drive gear fitted onto the output shaft when the brake device is un-energized.

4. A motor drive unit, comprising:
a drive motor serving as a prime mover of a vehicle;
a first differential unit having a first input element, a first output element and a first reaction element;
a second differential unit having a second input element, a second output element and a second reaction element;
a connection shaft connecting the first input element and the second input element;
an input gear fitted onto the connection shaft between the first input element and the second input element;
a drive gear fitted onto an output shaft of the drive motor while being meshed with the input gear to transmit torque between the connection shaft and the output shaft;
a torque reversing mechanism that transmits torque of any one of the first reaction element and the second reaction element to the other reaction element while reversing a direction of the torque;
a first driveshaft connected to the first output element and a second driveshaft connected to the second output element to which output torque of the drive motor is distributed;
a brake device that stops rotation of the drive gear fitted onto the output shaft by engaging at least one rotary member rotated integrally with the output shaft with at least one brake member that is allowed to rotate relatively to the rotary member but restricted to rotate in a rotational direction of the rotary member, the brake device being disposed on an opposite side of the drive motor across the drive gear fitted onto the output shaft;
a brake motor that generates torque when energized; and
an engagement force generating device that generates a thrust force to bring the brake member into frictional engagement with the rotary member when the torque of the brake motor is applied thereto, and that keeps the frictional engagement between the brake member and the rotary member to stop rotation of the output shaft when current supply to the brake motor is interrupted, wherein
the brake motor and the engagement force generating device are disposed on the opposite side of the drive motor across the drive gear fitted onto the output shaft.

5. The motor drive unit as claimed in claim 4, wherein the brake device includes an electromagnetic brake that establishes a magnetic attraction when energized to engage the brake member with the rotary member.

* * * * *